Oct. 29, 1968     F. C. HARZ ET AL     3,408,138

COOLING APPARATUS FOR MOTION PICTURE PROJECTOR

Filed Aug. 4, 1966     5 Sheets-Sheet 1

INVENTORS
FRED C. HARZ
FRANK S. TIMKO
BY
ATTORNEYS

Oct. 29, 1968   F. C. HARZ ET AL   3,408,138
COOLING APPARATUS FOR MOTION PICTURE PROJECTOR
Filed Aug. 4, 1966   5 Sheets-Sheet 3

INVENTORS
FRED C. HARZ
FRANK S. TIMKO
BY
ATTORNEYS

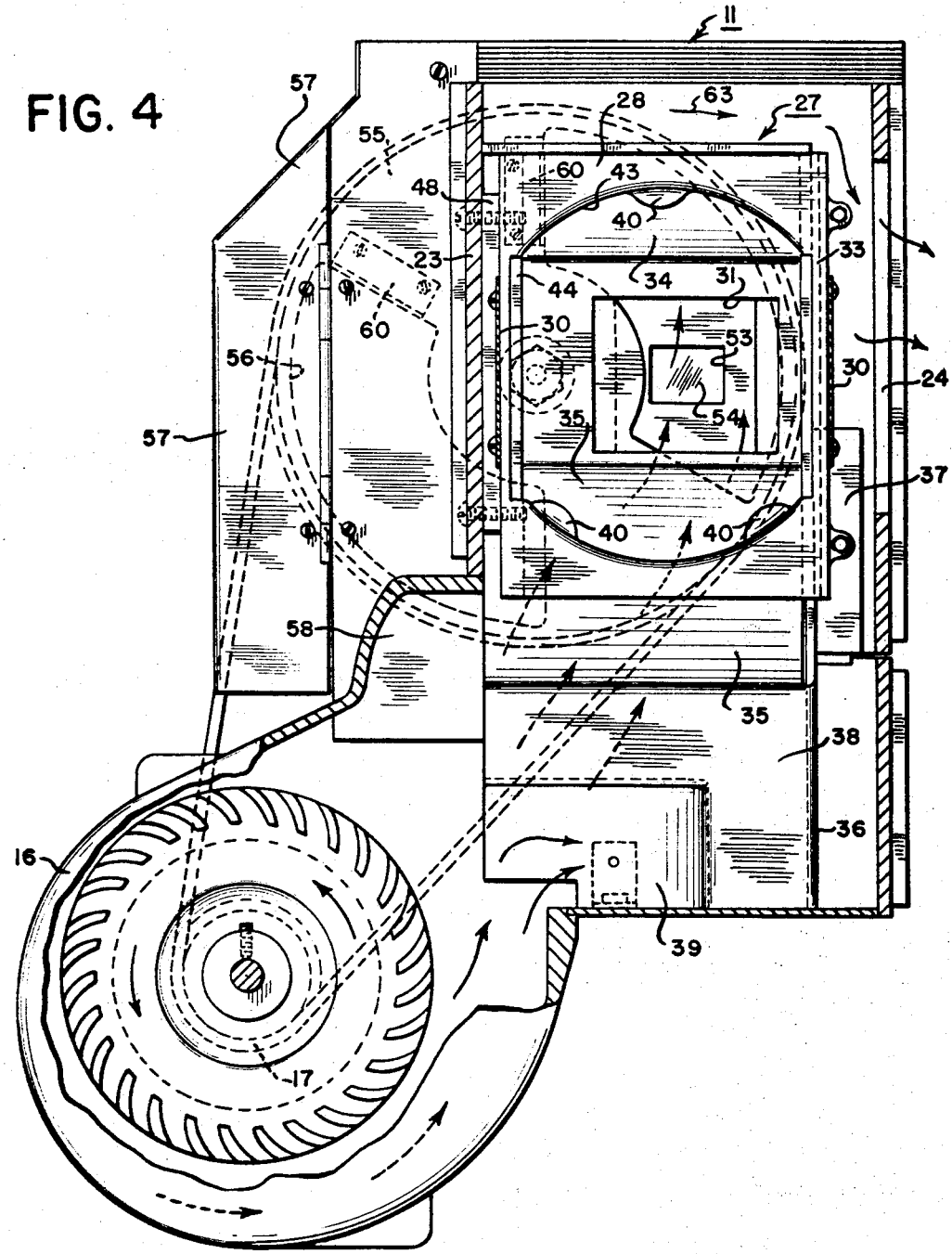

Oct. 29, 1968  F. C. HARZ ET AL  3,408,138
COOLING APPARATUS FOR MOTION PICTURE PROJECTOR
Filed Aug. 4, 1966  5 Sheets-Sheet 5
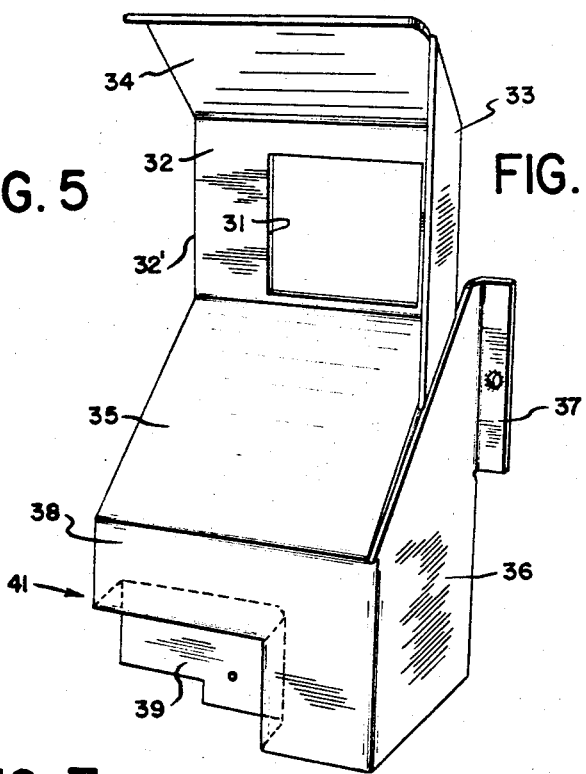
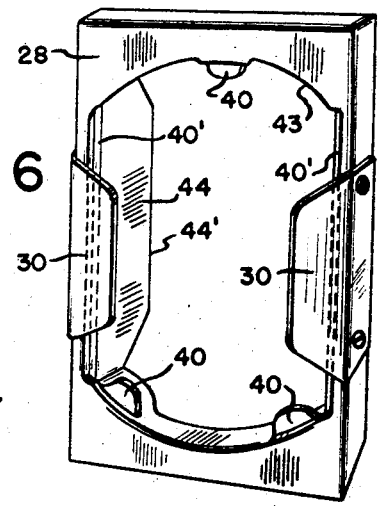
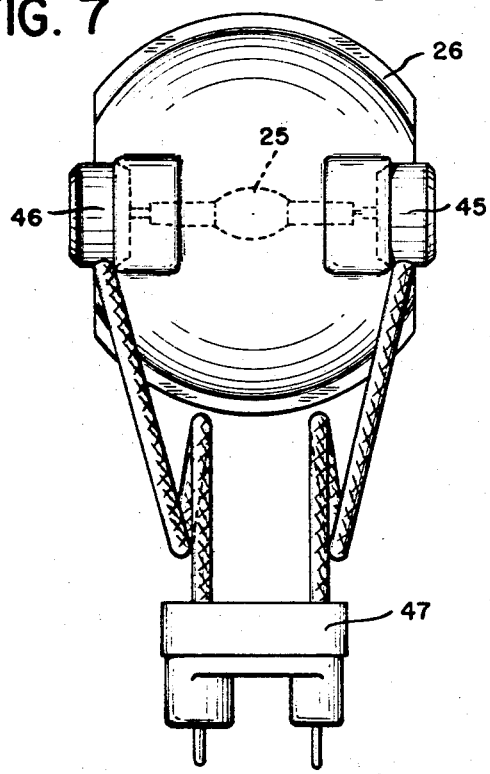
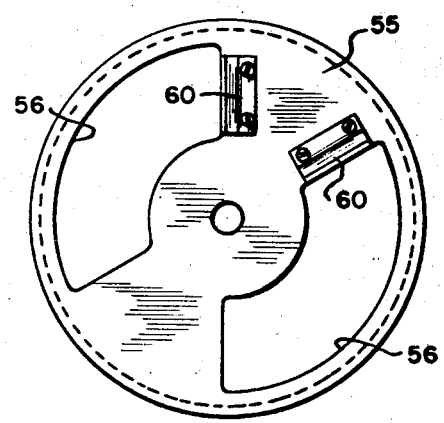
INVENTORS
FRED C. HARZ
FRANK S. TIMKO
ATTORNEYS United States Patent Office 3,408,138
Patented Oct. 29, 1968

3,408,138
COOLING APPARATUS FOR MOTION
PICTURE PROJECTOR
Fred C. Harz, Bronx, and Frank S. Timko, Maspeth, N.Y.,
assignors to Inflight Motion Pictures, Inc., New York,
N.Y., a corporation of Delaware
Filed Aug. 4, 1966, Ser. No. 570,279
7 Claims. (Cl. 352—202)

ABSTRACT OF THE DISCLOSURE

A motion picture projector using a two-terminal arc-type projection lamp having an integral reflector has an air baffle plate which fits over the front of the reflector and defines an air passageway from a blower up through the film gate. A rotary shutter located between the baffle plate and the film gate agitates the air such that the lamp and its terminals are cooled along with the film gate.

---

The invention has been especially developed in connection with a motion picture projector used for showing motion pictures in an airplane during flight. The general arrangement is shown in application Serial No. 464,888 filed May 11, 1965, now Patent No. 3,262,358, by Hicks and Mendelsohn for "Focusing Apparatus for a Motion Picture Projector." For such a use, the weight and power requirements must be kept as low as possible. On the other hand, a bright projected picture is desirable to reduce or eliminate the need for darkening the cabin. Thus it is desirable to use a projection lamp source of high efficiency.

An arc-type projection lamp is available which is compact and of high efficiency, and hence suitable in these respects for such an application. Such a lamp is available from the General Electric Co. under the trademark MARC-300. Briefly, it is a 300 watt quartz body arc lamp with an integral convex reflector. In use, it is necessary to provide proper cooling. If insufficient cooling is provided, the lamp life is decreased and there is danger of breakdown. On the other hand, if the lamp is overcooled, the color changes from white toward blue, reducing the brightness and impairing proper color rendition of color motion pictures. These cooling requirements pose problems in a projector designed for aircraft use, since added weight and complexity should be avoided.

The present invention provides a cooling arrangement which is simple, effective, and adds very little if any weight. It permits the use of the same motor for driving the blower and film feeding mechanism, in accordance with heretofore practice.

In accordance with the invention, a special baffle member is provided having a rear opening substantially fitting the open end of the lamp reflector and extending forwardly from the lamp with a front opening allowing passage of light for projection purposes. The baffle member is approximately closed in front of the lamp except for said front opening. A conventional rotating shutter disc is located between the baffle member and an apertured film guide plate through which film frame areas are illuminated for projection. The baffle member is mounted in a lamp housing provided with a blower and an air exit opening. The blower and exit opening are positioned to produce a current of air in the region between the front of the baffle member and the film guide plate and around the portion of the shutter disc located therein. In operation, the shutter disc agitates the air in front of the baffle opening and provides cooling of the arc lamp mounted at the rear of the baffle member. At the same time, the apertured film guide plate is cooled. Further, at least one exterior terminal of the arc lamp requires cooling, and provision is made for the current of air to pass over this terminal before leaving the housing. In this manner it is found that both the lamp, the film guide plate and the lamp terminal can be properly cooled with a very simple structure.

The invention will be further described in connection with a specific embodiment thereof shown in the accompanying drawings.

In the drawings:

FIG. 4 is a cross-section taken along line 4—4 of FIG. 3;

FIGS. 5 and 6 are perspective views of two parts of the baffle member which fit together in use;

FIG. 7 is a rear view of the arc-type projection lamp; and

FIG. 8 is a view of the front of the shutter disc.

Figure 1:
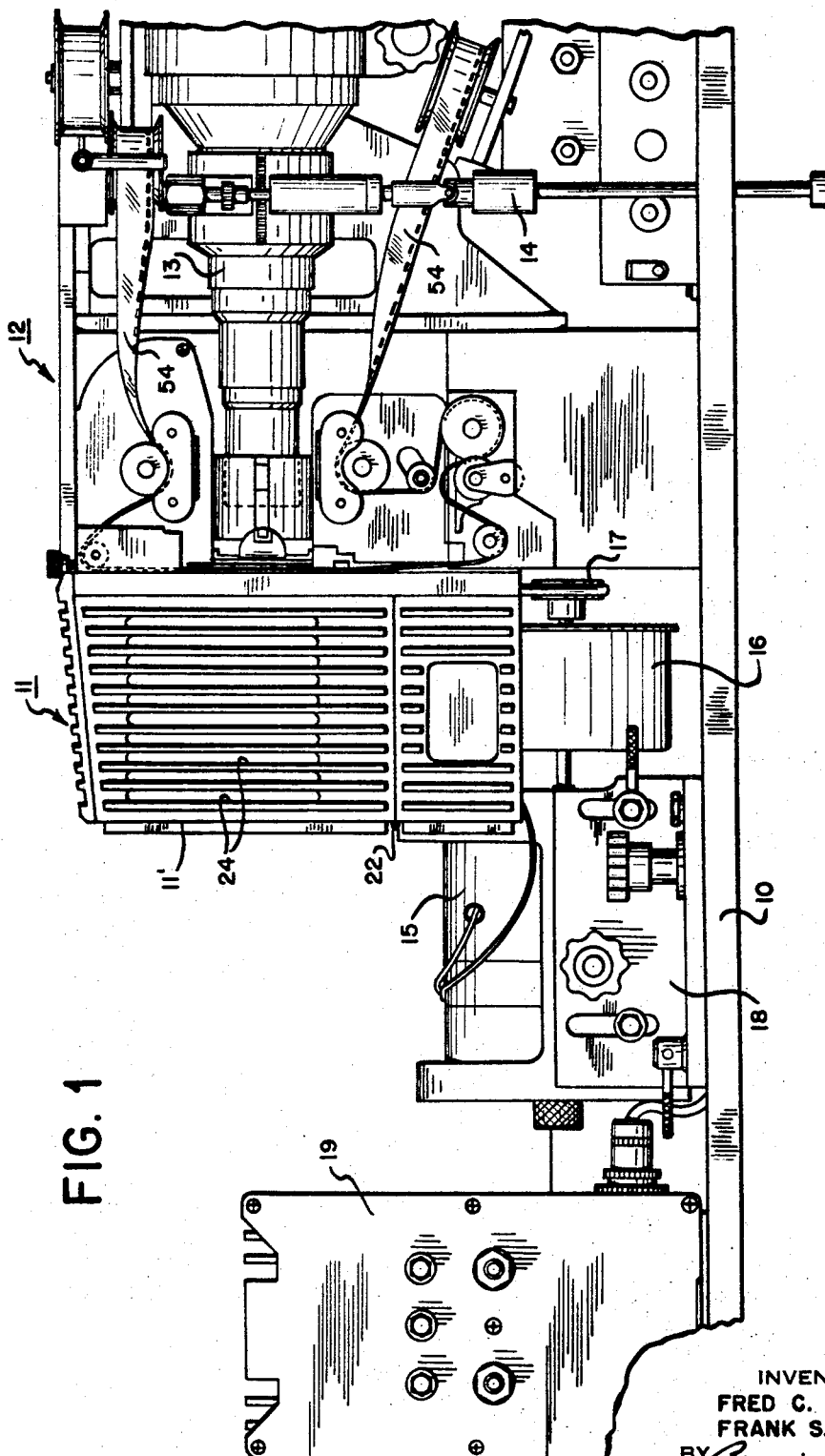
FIG. 1 is an overall side view of a portion of the projector.
Figure 2:
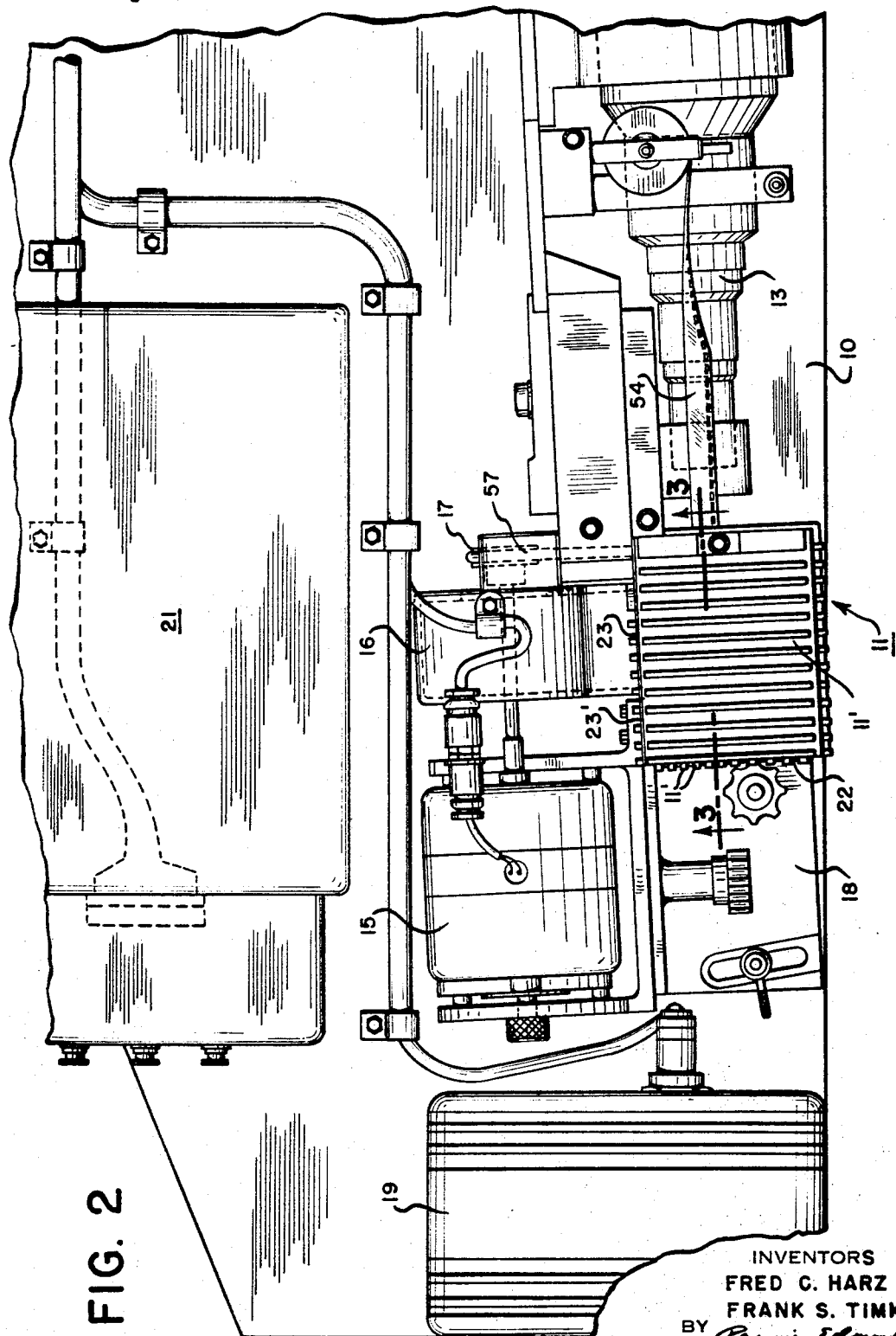
FIG. 2 is a top view thereof.

Referring to FIGS. 1 and 2, a motion picture projector and associated equipment are mounted on base plate 10. The projector includes a lamp housing 11, film feed mechanism 12, and projection lens 13 (shown only partially). A focusing arrangement 14 is provided as described in application Ser. No. 464,888. Motor 15 drives a blower 16, and rotates a shutter disc (55, FIG. 3) in housing 11 via a pulley and belt 17. The shutter disc is coupled to drive the film feed mechanism 12 by means not shown. The housing 11 and motor 15 are mounted on a bracket 18 arranged for vertical and horizontal adjustment so that the projected picture may be properly positioned on a projection screen (not shown). This mechanism forms no part of the present invention and hence need not be specifically described. An amplifier 19 for sound reproduction, and a power supply 21 are also mounted on the base plate 10. The power supply provides proper operating voltages for the projection lamp.

For convenience of access the upper portion of housing 11 is hinged at 22 to form cover 11'. The top of the housing is closed, and the rear is closed except for a small opening at the bottom thereof as will be described. One side, comprising a stationary plate 23 and side 23' of the movable cover, is also closed. The other side of the cover is provided with elongated openings 24 at the upper portion of the housing 11 for the exit of air.

Figure 3:
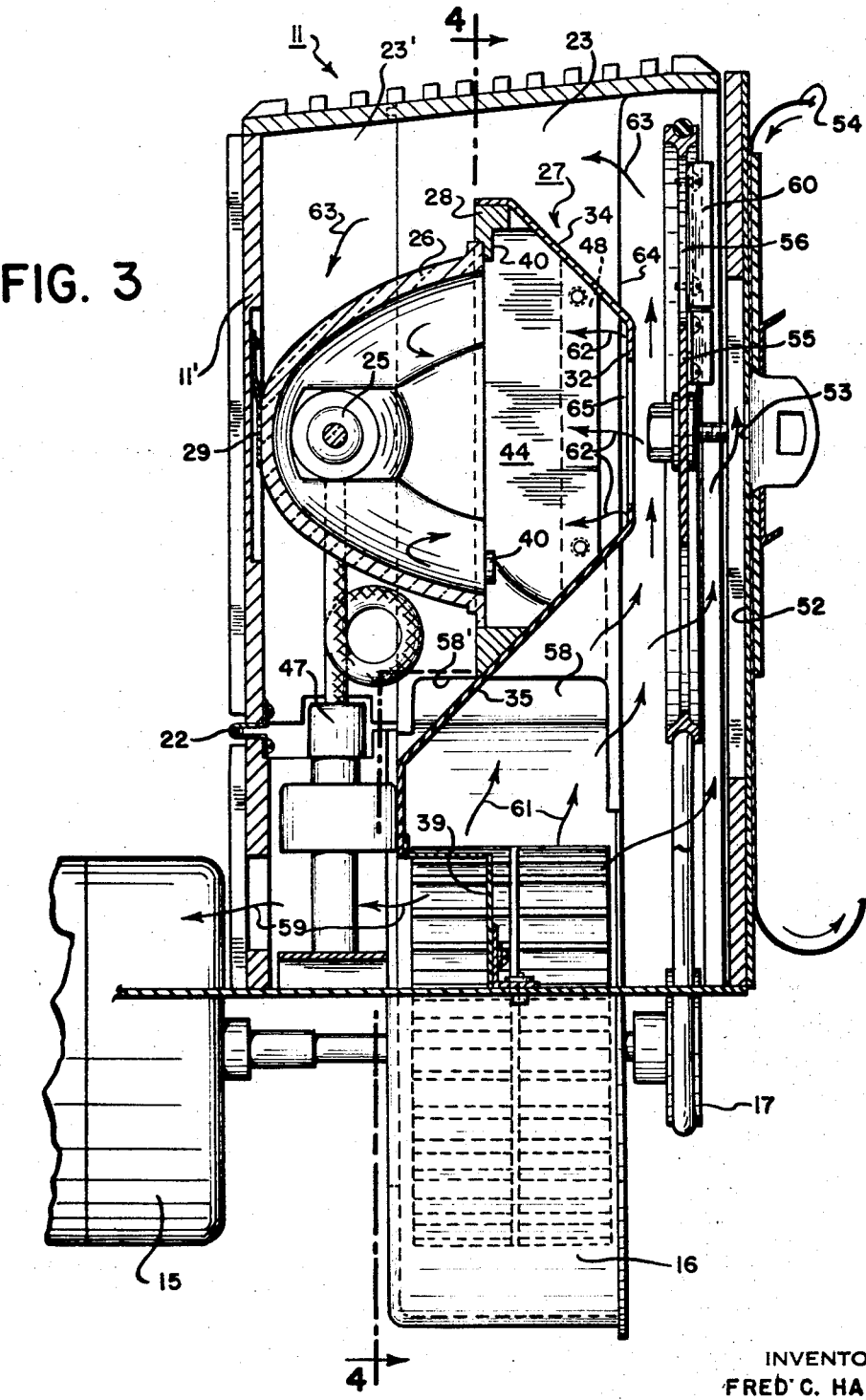
FIG. 3 is a cross-section of the lamp housing and blower arrangement taken along the line 3—3 of FIG. 2.

FIGS. 3 and 4 show the interior of the lamp housing 11, with portions of the nearby apparatus. An arc projection lamp 25 having an integral reflector 26 is mounted in the housing with a baffle member generally designated 27 extending forward therefrom. The baffle member includes a rear plate 28 having an opening substantially fitting the open end of reflector 26, and the lamp is held in the opening by a spring 29 attached to the rear of the cover 11'. Flat spring members 30 (see also FIG. 6) are attached to plate 28 to hold the lamp in position until the cover is closed.

The baffle member is shown by itself in FIGS. 5 and 6, and comprises two parts made separately for convenience but fitted together in use. FIG. 5 shows a sheet metal member having a front opening 31 in front surface 32, a side 33, and top and bottom sections 34 and 35 which are downwardly-forwardly and upwardly-forwardly sloping, respectively. A side partition 36 is dimensioned to extend to the bottom of the housing, and is provided with an ear 37 for mounting purposes. A rear partition 38 has a recessed section 39. Air from the blower is admitted, as indicated by arrow 41, to the underside of the sloping bottom 35 forward of the rear partition 38. Recess 39 allows a portion of the air to be directed back of the housing so as to cool amplifier 19. The remainder of the air passes up along the bottom of 35 and in front of opening 31, as will be described more fully later.

FIG. 6 shows the rear plate 28 having an opening 43 substantially fitting the open end of the lamp reflector 26. Lugs 40 and grooves 40′ provide a seat for the reflector. Side section 44 provides a side for the assembled baffle member opposite to side 33 of FIG. 5. When assembled with the lamp in place, the baffle member is approximately closed in front of the lamp except for front opening 31. A small slot opening may be provided between the edge 44′ of side 44 and the edge 32′ of the front surface, if desired.

FIG. 7 shows a rear view of the lamp, including reflector 26 and terminals 45 and 46. The terminals extend through the respective sides of the reflector toward the rear thereof, as seen in FIG. 3, and mount a quartz envelope 25 containing a gaseous atmosphere and a pair of electrodes connected to the terminals. A high voltage pulse ionizes the gas to establish an arc discharge, and a sustained low voltage direct current maintains the discharge thereafter. Power supply 21 furnishes these voltages. In the specific lamp used, one terminal 45 had the corresponding lamp electrode and envelope rigidly affixed therein and required substantial cooling to avoid overheating. The other electrode and corresponding end of the envelope were designed to allow expansion, and consequently terminal 46 did not require as much cooling. The terminals are connected through leads to plug 47.

Returning to FIGS. 3 and 4, the baffle member is mounted in housing 11 with side 44 adjacent the corresponding side member 23 of the housing. A spacer plate 48 closes the gap between 44 and 23. Side 33 of the baffle member is spaced from the adjacent side of the housing. Also, the top 34 of the baffle member is spaced from the top of the housing.

At the front of the housing is a film guide plate 52 having an aperture 53 therein to illuminate film frame areas of film 54. A shutter disc 55 is positioned between the baffle member 27 and the film guide plate 52 and is belt-driven by pulley 17. The shutter disc has openings 56 for intermittently passing projection light to the film frame aperture 53. The shutter disc extends laterally from the main portion of housing 11 and is covered by a sheet metal housing extension 57, part of which is hinged for convenient access.

FIG. 8 shows the shutter disc separately. A pair of fins 60 are fastened to the front surface of the disc and project therefrom to increase agitation of the air as the disc rotates.

Blower 16 has an outlet 58 which supplies air to the housing below the sloping bottom 35 of the baffle member. A portion of the air enters recess 39 and travels to the rear of the housing as indicated by arrows 59 to cool amplifier 19 (FIG. 1). A small portion 58′ of outlet 58 may extend above bottom 35 to assist the cooling of the outside of lamp reflector 26 and the lamp terminals.

Most of the air travels upwards in front of the baffle member as indicated by arrows 61, and around the shutter disc 55. The shutter disc, and particularly the openings 56 therein, agitate the air in front of the baffle member and cause air to enter within the baffle member as indicated by arrows 62, thereby cooling the arc lamp 25.

As the air travels upward in the housing, it also cools the film guide plate 52, which can become very hot in the vicinity of film frame aperture 53. The air then passes over the top of the baffle as indicated by arrows 63 and emerges from the housing through openings 24 (FIG. 1) in the side thereof. These openings are on the same side as terminal 45 of the lamp, and consequently this terminal is cooled effectively. Some air of course also passes by terminal 46 to produce cooling.

Edge 64 of the side plate 23 substantially coincides with the rearward portion of housing extension 57 which extends laterally outward. If desired, the front surface 32 of the baffle member may be positioned slightly in front of edge 64 so as to leave a narrow slot 65 for passage of air therethrough.

In the specific embodiment shown the bottom of housing extension 57 was left open to allow the passage of the belt which drives the shutter disc and permit convenient belt replacement.

It is found that with this arrangement adequate cooling of the arc lamp 25 can be obtained, without overcooling which would result in change in color of the projection light. Further, the film guide plate is adequately cooled, and also the projecting terminals of the lamp. As will be seen, this is accomplished in a very simple manner, without adding substantial weight, and only the conventional blower is required so that power requirements are not increased.

We claim:
1. A motion picture projector comprising
 (a) a lamp housing,
 (b) an arc lamp having a concave reflector integral therewith mounted in said housing,
 (c) a film guide plate mounted toward the front of said housing and having a film frame aperture therein,
 (d) film feed mechanism mounted to move a film in front of said aperture,
 (e) a projection lens mounted to project film frame areas illuminated through said aperture,
 (f) a baffle member extending forwardly from said lamp and having a rear opening substantially fitting the open end of said reflector and a front opening allowing light to reach said aperture,
 (g) said baffle member being approximately closed in front of said lamp except for said front opening,
 (h) a rotating shutter disc positioned between the front of said baffle member and said film guide plate,
 (i) said disc having openings for alternately passing and occluding light to said aperture,
 (j) a blower for supplying air to said housing,
 (k) and an air exit opening in said housing,
 (l) said blower and air exit opening being positioned to produce a current of air in the region between the front of said baffle member and the film guide plate and around the portion of said shutter disc located therein.

2. Apparatus according to claim 1 in which said baffle member has an upwardly-forwardly sloping bottom and said blower is positioned to introduce air below said sloping bottom.

3. Apparatus according to claim 2 in which said baffle member is mounted with the top and one side thereof spaced from the housing, and including a partition extending from said one side to the bottom of the housing, said air exit opening being located in the side of said housing corresponding to said one side of the baffle member.

4. Apparatus according to claim 3 in which the top of said baffle member is downwardly-forwardly sloping.

5. Apparatus according to claim 4 in which the other side of said baffle member is apertured in front of said lamp for an area which is small compared to said front opening thereof.

6. Apparatus according to claim 4 in which said arc lamp has at least one terminal exterior of said reflector and toward the rear thereof to be cooled, said lamp being mounted with said terminal on said one side of the baffle member.

7. Apparatus according to claim 4 in which said blower includes a drive motor and said drive motor is coupled to drive said shutter disc and film feed mechanism.

References Cited

UNITED STATES PATENTS

| | | | |
|---|---|---|---|
| 2,135,500 | 11/1938 | Foster | 88—24 |
| 2,362,601 | 11/1944 | Wengel | 88—24 |
| 3,152,509 | 10/1964 | Zillmer | 352—202 |
| 3,338,132 | 8/1967 | Ruhle | 88—24 |

NORTON ANSHER, *Primary Examiner.*

M. H. HAYES, *Assistant Examiner.*